United States Patent
Wang et al.

(10) Patent No.: US 11,349,926 B1
(45) Date of Patent: May 31, 2022

(54) PROTECTED SMART CONTRACTS FOR MANAGING INTERNET OF THINGS DEVICES

(71) Applicant: Trend Micro Incorporated, Tokyo (JP)

(72) Inventors: Tai-An Wang, Taipei (TW);
Liang-Chih Chen, Taipei (TW);
Yu-Shu Chen, Taipei (TW); Ting-Yin Yen, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 450 days.

(21) Appl. No.: 16/372,840

(22) Filed: Apr. 2, 2019

(51) Int. Cl.
*H04L 67/12* (2022.01)
*H04L 67/1097* (2022.01)
*H04L 9/40* (2022.01)

(52) U.S. Cl.
CPC .......... *H04L 67/12* (2013.01); *H04L 63/1416* (2013.01); *H04L 67/1097* (2013.01)

(58) Field of Classification Search
CPC ....................................................... H04L 67/12
See application file for complete search history.

(56) References Cited

U.S. PATENT DOCUMENTS

| | | | | |
|---|---|---|---|---|
| 2010/0175113 | A1* | 7/2010 | Borghetti | H04L 63/08 726/5 |
| 2017/0232300 | A1* | 8/2017 | Tran | H04L 67/12 434/247 |
| 2018/0089758 | A1* | 3/2018 | Stradling | G06Q 20/3829 |
| 2018/0287806 | A1* | 10/2018 | Carboni | G06F 17/16 |
| 2018/0337769 | A1* | 11/2018 | Gleichauf | G06Q 20/29 |

OTHER PUBLICATIONS

White Paper—A Next-Generation Smart Contract and Decentralized Application Platform, 41 sheets [retrieved on Mar. 29, 2019], retrieved from the internet: https://igthub.com/ethereum/wiki/wiki/White-Paper.

* cited by examiner

*Primary Examiner* — Nicholas P Celani
(74) *Attorney, Agent, or Firm* — Patrick D. Benedicto

(57) ABSTRACT

A system includes Internet of things (IOT) devices that are paired with corresponding edge computers. Smart contracts are generated for edge computers, and deployed in a blockchain. Upon receipt of a message, a smart contract compares a sender of the message to a designated owner of the smart contract. The smart contract has a privilege checker that allows a message from the owner of the smart contract to initiate execution of a function that modifies a variable of the smart contract, but prevents messages from non-owners from initiating execution of the function.

9 Claims, 4 Drawing Sheets

PROTECTED SMART CONTRACTS FOR MANAGING INTERNET OF THINGS DEVICES

COPYRIGHT NOTICE

A portion of the disclosure of this patent document contains material to which a claim for copyright is made. The copyright owner has no objection to the facsimile reproduction by anyone of the patent document or the patent disclosure, as it appears in the United States Patent and Trademark Office patent file or records, but reserves all other copyright rights whatsoever.

BACKGROUND OF THE INVENTION

1. Field of the Invention

The present invention relates generally to machine-to-machine communication and distributed ledger technology.

2. Description of the Background Art

Internet of things (IOT) refers to network connectivity of everyday devices and other devices that are traditionally "dumb." IOT devices include smart sensors, transducers, and so on. When deployed in a smart home, IOT devices allow for home automation, such as control of thermostats, light bulbs, door locks, etc., remotely over the Internet. Similarly, smart cities may have hundreds if not thousands of IOT devices for surveillance, pollution monitoring, and other functions accessible over the Internet.

Unfortunately, the main strength of IOT devices, i.e., network connectivity, is also its main weakness. More particularly, a cyberattack may be launched against IOT devices to gain control of them for malicious purposes.

SUMMARY

In one embodiment, a system includes Internet of things (IOT) devices that are paired with corresponding edge computers. Smart contracts are generated for edge computers and deployed in a blockchain. Upon receipt of a message, a smart contract compares a sender of the message to a designated owner of the smart contract. The smart contract has a privilege checker that allows a message from the owner of the smart contract to initiate execution of a function that modifies a variable of the smart contract, but prevents messages from non-owners from initiating execution of the function.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
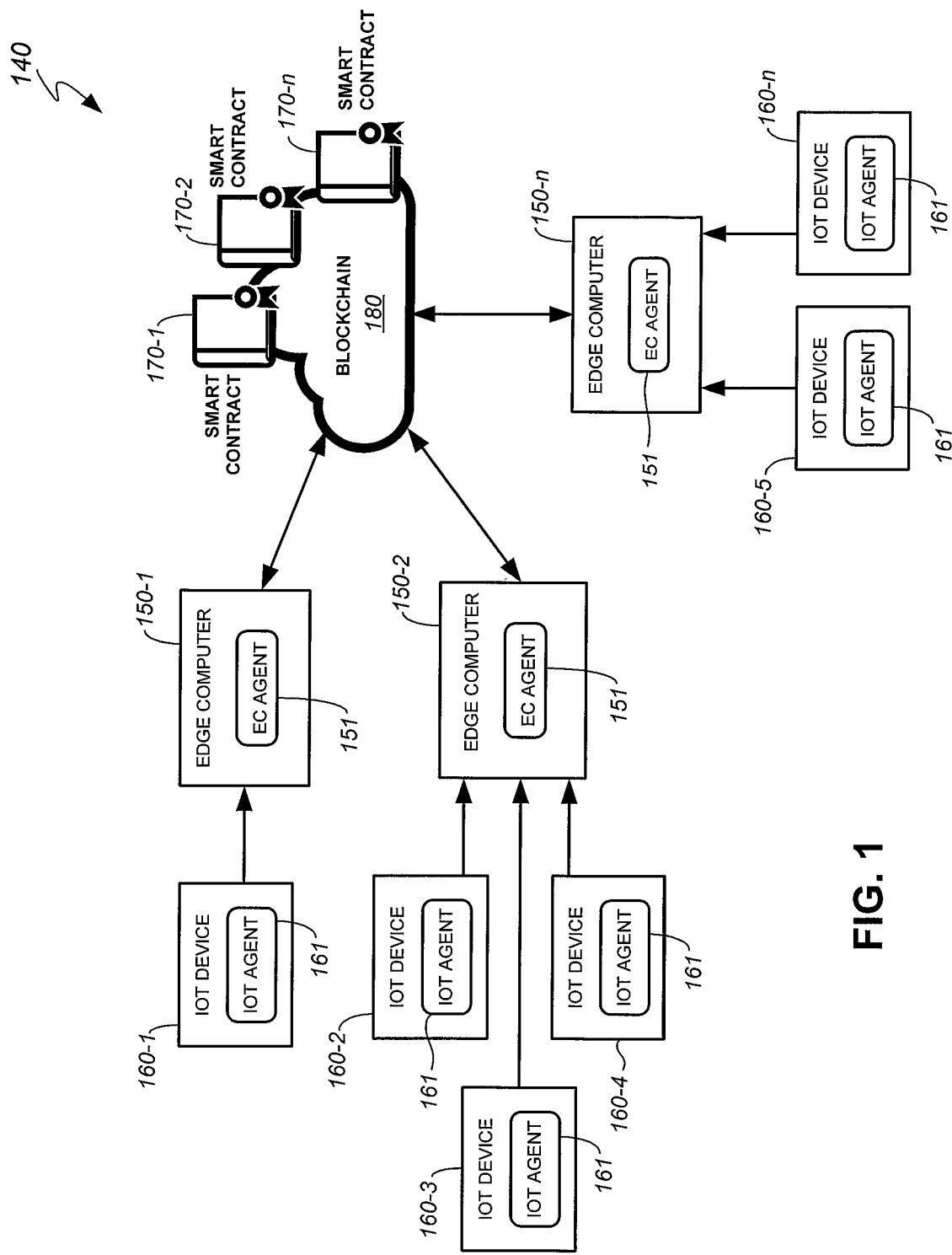
FIG. 1 shows a logical diagram of a system for secure machine-to-machine (M2M) communications in accordance with an embodiment of the present invention.

FIG. 1 shows a logical diagram of a system 140 for secure machine-to-machine (M2M) communications in accordance with an embodiment of the present invention. M2M communications involves communications between two or more computing devices, such as between IOT devices, between nodes of a blockchain, an edge computer and a node of a blockchain, between an IOT device and an edge computer, and so on.

In the example of FIG. 1, the system 140 includes a plurality of edge computers 150 (i.e., 150-1, 150-2, ..., 150-n), a plurality of IOT devices 160 (i.e., 160-1, 160-2, ..., 160-n), a plurality of smart contracts 170 (i.e., 170-1, 170-2, ..., 170-n), and a blockchain 180.

In one embodiment, each of the edge computers 150 is a node of the blockchain 180. In accordance with an edge computing architecture, an edge computer 150 may allow processing of IOT data (i.e., data generated by an IOT device 160) closer to where the IOT data was generated. An edge computer 150 may be paired with one or more IOT devices 160 to serve as a gateway of the IOT devices 160. As a particular example, the edge computer 150-1 serves as a gateway of an IOT device 160-1. Similarly, the edge computer 150-2 serves as a gateway of IOT devices 160-2, 160-3, and 160-4.

In the example of FIG. 1, an edge computer 150 includes an edge computer agent 151 comprising instructions stored in a memory of the edge computer 150. The instructions of the edge computer agent 151, when executed by a processor of the edge computer 150, may cause the edge computer 150 to send messages to smart contracts 170 on behalf of an IOT device 160. Such messages may trigger execution of contract code of a corresponding smart contract 170 to perform a function, such as to recognize an IOT device 160 as part of the system 140 ("on-boarding"), provision resources for supporting an IOT device 160 ("provisioning"), etc.

In the example of FIG. 1, an IOT device 160 includes an IOT agent 161 comprising instructions stored in a memory of the IOT device 160. The instructions of the IOT agent 161, when executed by a processor of the IOT device 160, may cause the IOT device 160 to store a security key of an account on the blockchain 180, to be paired with a corresponding edge computer 150, and to send IOT data to the edge computer 150. As its name indicates, IOT data is data from an IOT device 160. The edge computer 150 may send the IOT data as a message to a corresponding smart contract 170.

The blockchain 180 may comprise computing infrastructure of a blockchain or other distributed ledger technology (DLT). In one embodiment, the blockchain 180 comprises an ETHEREUM distributed computing platform. A smart contract 170 may be an application in the blockchain 180 for performing business-logic computing (e.g. on-boarding, provisioning, paring, M2M communications, and so on . . . ) and may have its own account on the blockchain 180. An edge computer 150 may maintain an "externally owned account" (EOA) on the blockchain 180 on behalf of an IOT device 160. An IOT agent 161 may be configured to store a private key of a corresponding EOA, and an edge computer 150 may send a message to a smart contract 170 by sending a transaction from the EOA.

A smart contract 170 (i.e., 170-1, 170-2, . . . , 170-n) may include contract code for performing one or more functions of the smart contract 170. The contract code of the smart contract 170 may be executed when a message is received and validated by the smart contract 170. A smart contract 170 is deployed on the blockchain 180.

The edge computer 150-1 may request creation of a smart contract 170-1 for the IOT device 160-1. As a particular example, the IOT device 160-1 may be a pollution sensor and the smart contract 170-1 has contract code that receives a reading of a pollution level, compares the pollution level to a threshold, and triggers an alarm when the pollution level exceeds the threshold. In that particular example, the edge computer 150-1 may maintain an EOA for the IOT device 160-1, receive readings of pollution levels from the IOT device 160-1, and send transactions that include the readings to the smart contract 170-1. A transaction may include a message containing the readings and other application data, a signature identifying the edge computer 150-1 as the sender of the transaction, and other data expected by the particular implementation of the blockchain 180. In one embodiment where the blockchain 180 comprises an ETHEREUM distributed computing platform, the transaction may further include an amount of ether, STARTGAS value, and GASPRICE value. As can be appreciated, the particular format of transactions and messages will depend on the particulars of the blockchain 180. Furthermore, embodiments of the present invention are not limited to the just-described pollution level example. In general, the smart contracts 170 may be used to perform functions for a wide variety of applications.

Generally speaking, a potential problem with smart contracts is that any computer that has an account on the blockchain may use a function of any smart contract on the blockchain. That is, a computer may send a message to execute contract code of a smart contract, even when the computer is not the owner of the smart contract. The inventors believe that this creates security concerns for IOT devices, as cybercriminals may modify data in the smart contracts for malicious purposes. As will be more apparent below, embodiments of the present invention include security measures that prevent non-owners of smart contracts from modifying data of smart contracts.

Figure 2:
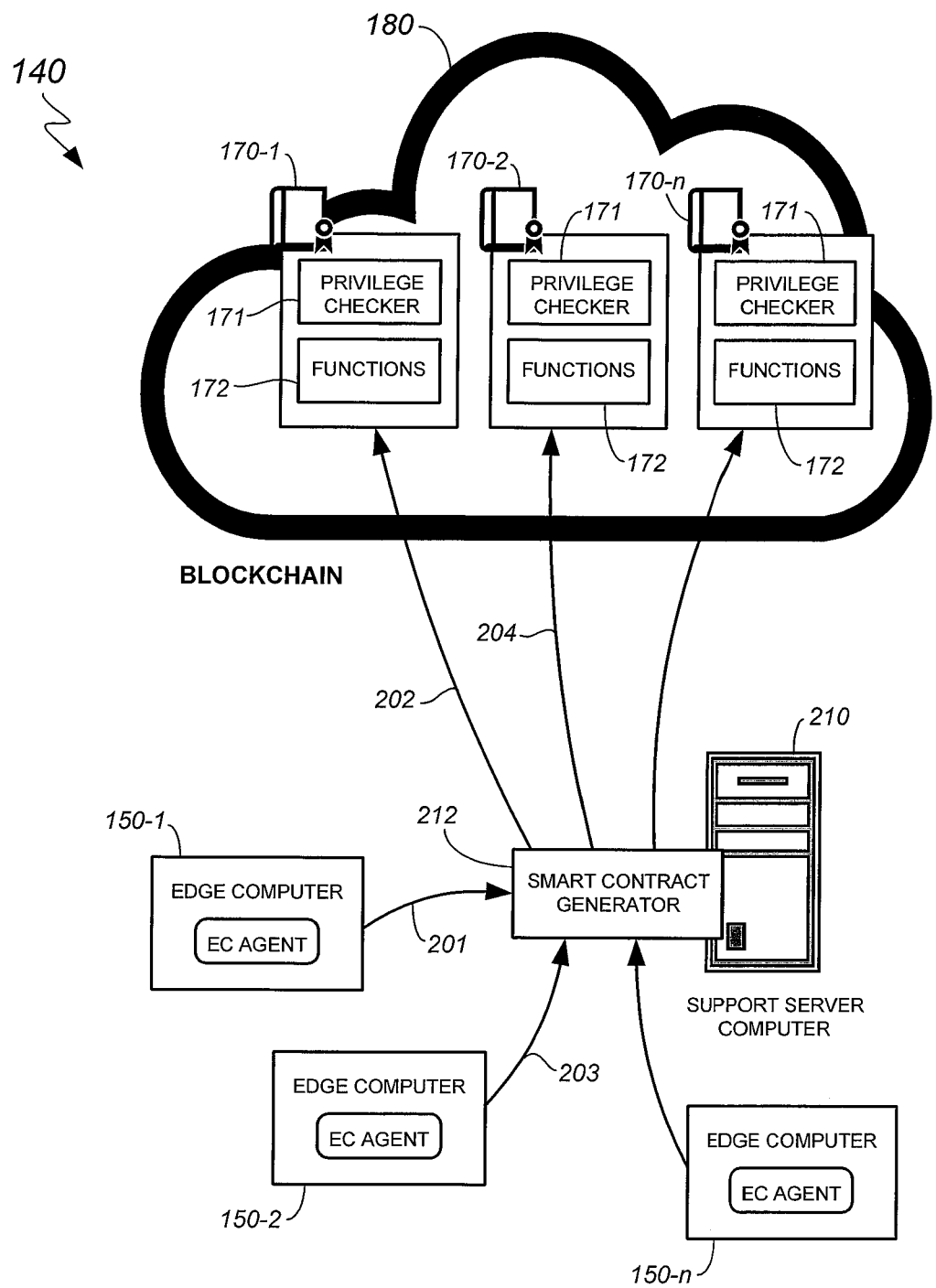
FIG. 2 shows another logical diagram of the system of FIG. 1, in accordance with an embodiment of the present invention.

FIG. 2 shows a logical diagram of the system 140 in accordance with an embodiment of the present invention. In the example of FIG. 2, the system 140 further includes a support server computer 210 that runs a smart contract generator 212.

In one embodiment, the smart contract generator 212 comprises instructions that when executed by a processor of the support server computer 210 cause the support server computer 210 to generate a smart contract 170 that has a privilege checker 171 and one or more functions 172. The privilege checker 171 and the functions 172 may be part of the contract code of the smart contract 170. Generally speaking a function of a smart contract varies by application. For example, the functions 172 may perform provisioning, onboarding, sensor readings, alerting, data collection, and other functionalities that support the operation of the IOT devices 160.

As its name indicates, the privilege checker 171 is configured to check the privilege of a message sender before allowing that message sender to modify data of the smart contract. In one embodiment, the smart contract generator 212 configures the privilege checker 171 so that only the owner of the smart contract 170 can modify data of the smart contract 170. Modifying data of the smart contract 170 includes setting or changing values of variables of the smart contract 170. In one embodiment, the owner of a smart contract 170 is the node of the blockchain 180 that requested the smart contract generator 212 to generate the smart contract 170.

As a particular example, the edge computer 150-1 may request the smart contract generator 212 to generate the smart contract 170-1 (see arrow 201). In response, the smart contract generator 212 may generate the smart contract 170-1, designate the edge computer 150-1 as the owner of the smart contract 170-1, and deploy the smart contract 170-1 on the blockchain 180 (see arrow 202). This prevents other nodes of the blockchain 180, such as the edge computer 150-2, etc., from modifying data of the smart contract 170-1. For example, when the edge computer 150-2 sends a message to execute a function 172 that sets data of the smart contract 170-1, the privilege checker 171 of the smart contract 170-1 will detect that the sender of the message, i.e., the edge computer 150-2, is not the owner of the smart contract 170-1. Accordingly, the smart contract 170-1 will not execute the function 172.

Similarly, the edge computer 150-2 may request the smart contract generator 212 to generate the smart contract 170-2 (see arrow 203). In response, the smart contract generator 212 may generate the smart contract 170-2, designate the edge computer 150-2 as the owner of the smart contract 170-2, and deploy the smart contract 170-2 on the blockchain 180 (see arrow 204). This prevents other nodes of the blockchain 180 from modifying data of the smart contract 170-2.

The support server computer 210 is depicted as being a separate, stand-alone computer in the system 140. As can be appreciated, the functionality of the support server computer 210 may be incorporated in other physical or virtual computer by incorporating the smart contract generator 212, for example.

Table 1 below shows a pseudo-code of an example smart contract in accordance with an embodiment of the present invention.

TABLE 1

```
contract Sample {
    address public owner;
    mapping (address => address[ ]) _IoT2Gateway;
    constructor( ) public {
        owner = msg.sender;
    }
    modifier onlyOwner {
        require(msg.sender = owner);
        -;
    }
    function mapIoT2Gateway(address addrGateway, address addrIoT)
    public onlyOwner returns(uint length) {
        return _IoT2Gateway[addrGateway].push(addrIoT);
    }
}
```

In the example of Table 1, the smart contract has a privilege checker that designates the creator of the smart contract as the owner of the smart contract (see function "constructor( )") and that allows only the owner to modify variables of the smart contract (see function "modifier onlyOwner"). The smart contract may compare the sender of a message to the owner of the smart contract to validate the message. The smart contract has a variable "_IoT2Gateway" that indicates the address of an edge computer to which an IOT device is paired. The smart contract includes a function that pairs an IOT device to the edge computer (see function "mapIoT2Gateway").

The function "modifier onlyOwner" may include code logic that prevents setting the value of the variable "_IoT2Gateway" and exits when the sender of the message received by the smart contract is not the owner of the smart contract. Otherwise, when the sender of the message is the owner of the smart contract, the function "mapIoT2Gateway" executes.

Figure 3:
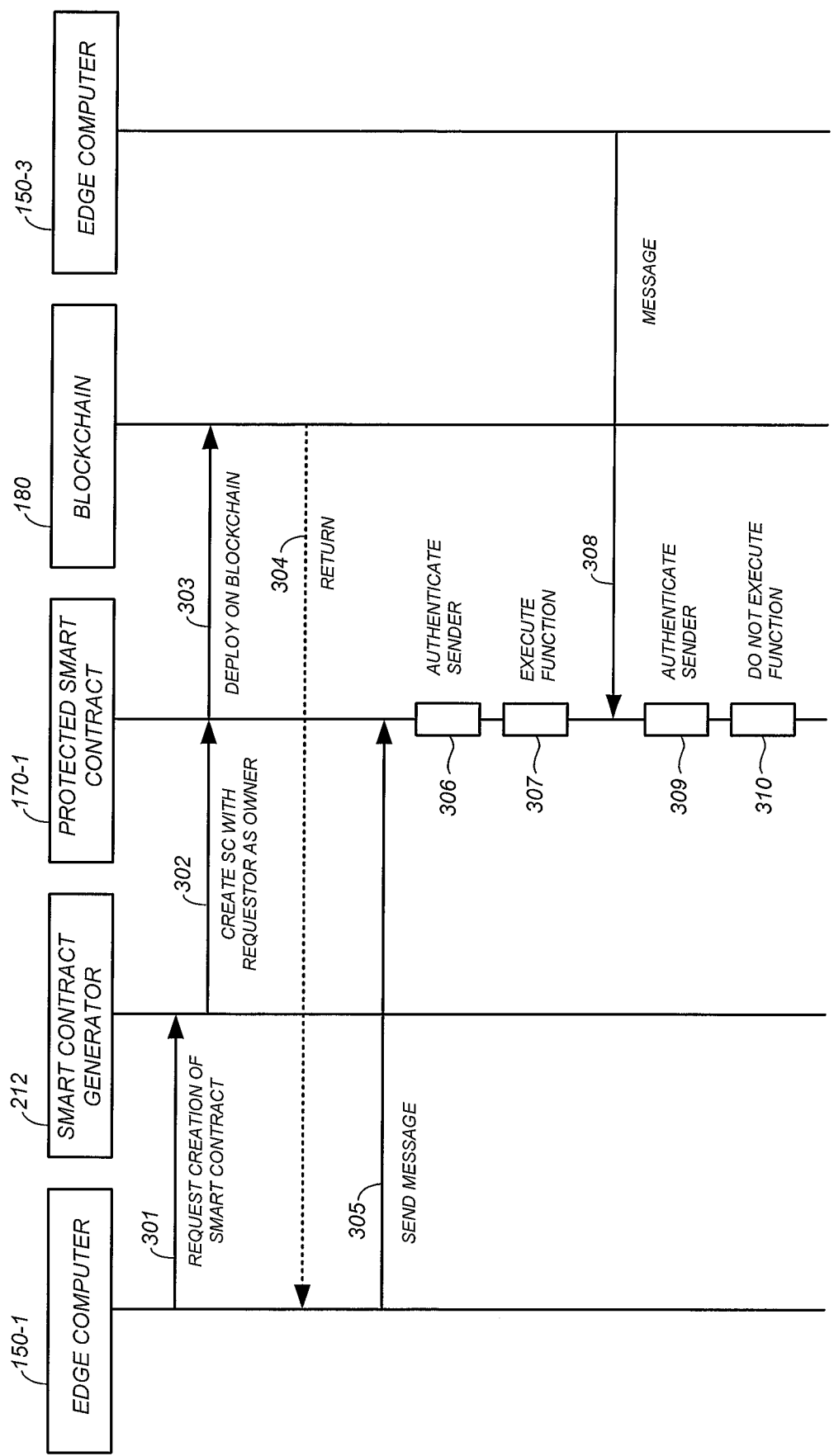
FIG. 3 shows a call diagram of a computer-implemented method of managing Internet of things (IOT) devices with smart contracts in accordance with an embodiment of the present invention.

FIG. 3 shows a call diagram of a computer-implemented method of managing IOT devices with smart contracts in accordance with an embodiment of the present invention. The method of FIG. 3 is explained using the components of the system 140 (see FIGS. 1 and 2) for illustration purposes. Other suitable components may also be employed without detracting from the merits of the present invention.

In the example of FIG. 3, the edge computer 150-1 sends a request to the smart contract generator 212 to create a smart contract 170-1 (see arrow 301). The smart contract 170-1 is for supporting the operation of the IOT device 160-1 (shown in FIG. 1). In response, the smart contract generator 212 generates the smart contract 170-1 with the edge computer 150-1 being designated as the owner of the smart contract 170-1 (see arrow 302), and deploys the smart contract 170-1 on the blockchain 180 (see arrow 303). The smart contract generator 212 may return to the edge computer 150-1 an address, identifier, or other locator for sending a message to the smart contract 170-1 (see arrow 304).

The smart contract 170-1 is generated by the smart contract generator 212 with one or more functions 172 that support operation of the IOT device 160-1. The smart contract generator 212 may access a database (not shown) that contains predetermined functions 172 for particular IOT devices 160 and/or edge computers 150. The request from the edge computer 150-1 may include an identifier of the IOT device 160-1, allowing the smart contract generator 212 to insert the suitable functions 172 in the smart contract 170-1. In other embodiments, the request from the edge computer 150-1 may include the functions 172 for supporting operations of the IOT device 160-1.

The edge computer 150-1 sends, to the smart contract 170-1, a transaction to execute a function 172 that modifies a variable of the smart contract 170-1. The transaction may include a message (see arrow 305) that indicates the smart contract 170-1 as the recipient of the message, the edge computer 150-1 as the sender of the message, IOT data of the IOT device 160-1, and other information. Upon receipt of the message, the smart contract 170-1 authenticates the sender of the message by determining whether or not the sender of the message is the owner of the smart contract 170-1 (see action 306). In the example of FIG. 3, the edge computer 150-1 is the designated owner of the smart contract 170-1. Accordingly, the smart contract 170-1 executes the function 172.

In the example of FIG. 3, an edge computer 150-3 is not the owner of the smart contract 170-1. The edge computer 150-3 may send a transaction to the smart contract 170-1 (see arrow 308). The transaction may include a message to execute the function 172 that modifies a variable of the smart contract 170-1. Upon receiving the message, the smart contract 170-1 authenticates the sender of the message as before (see action 309). This time, however, the authentication fails because the edge computer 150-3 is not the designated owner of the smart contract 170-1. Accordingly, the smart contract 170-1 does not execute the function 172 (see action 310).

Figure 4:
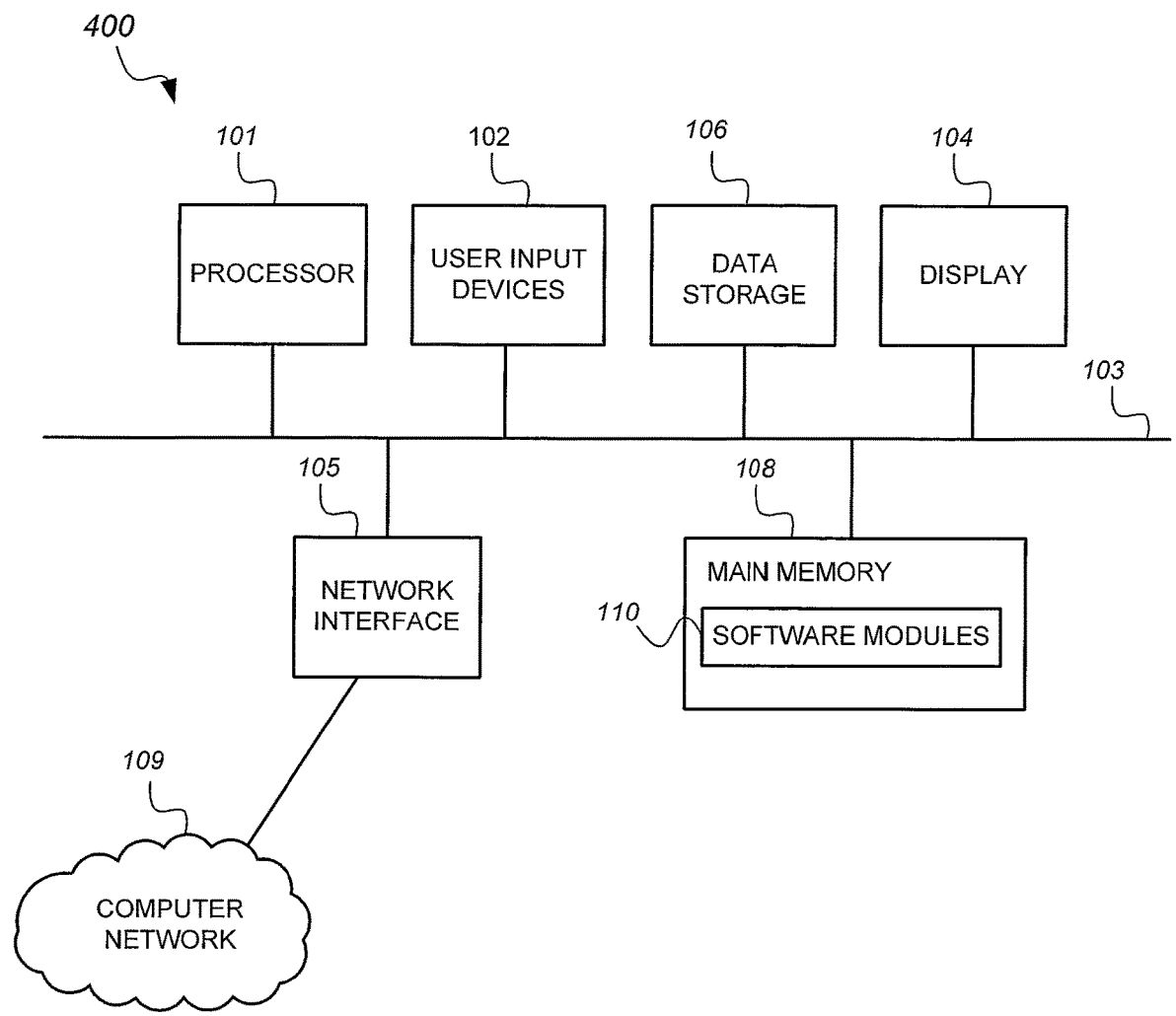
FIG. 4 shows a logical diagram of a computer system that may be employed with embodiments of the present invention.

FIG. 4 shows a logical diagram of a computer system 400 that may be employed with embodiments of the present invention. The computer system 400 may be employed as an edge computer, support server computer, or other computer described below. The computer system 400 may have fewer or more components to meet the needs of a particular application. The computer system 400 may include one or more processors 101. The computer system 400 may have one or more buses 103 coupling its various components. The computer system 400 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 400 is a particular machine as programmed with one or more software modules 110, comprising instructions stored non-transitory on the main memory 108 for execution by the processor 101 to cause the computer system 400 to perform corresponding programmed steps. An article of manufacture may be embodied as computer-readable Storage medium including instructions that when executed by the processor 101 cause the computer system 400 to be operable to perform the functions of the one or more software modules 110.

In embodiments where the computer system 400 is configured as an edge computer, the software modules 110 may comprise instructions of an edge computer agent. In embodiments where the computer system 400 is configured as a support server computer, the software modules 110 may comprise a smart contract generator.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
designating a node of a blockchain that initiated generation of a smart contract as a designated owner of the smart contract;
deploying the smart contract on the blockchain;
receiving, by the smart contract, a first message addressed to the smart contract, the first message including data of an Internet of things (IOT) device;
detecting, by the smart contract, that a sender of the first message is the designated owner of the smart contract;
executing a function of the smart contract to modify a variable of the smart contract in response to detecting that the sender of the first message is the designated owner of the smart contract;
receiving, by the smart contract, a second message addressed to the smart contract;

detecting, by the smart contract, that the sender of the second message is not the designated owner of the smart contract; and preventing execution of the function in response to detecting that the sender of the second message is not the designated owner of the smart contract.

2. The method of claim 1, wherein the first message is included in a transaction sent by an edge computer that is paired with the IOT device.

3. The method of claim 2, wherein the edge computer is the node of the blockchain that initiated generation of the smart contract, and the method further comprises:

receiving a request from the edge computer to generate the smart contract; and designating the edge computer as the owner of the smart contract in response to receiving the request.

4. A system comprising:

a first Internet of things (IOT) device;

an edge computer that is configured to receive IOT data from the first IOT device and send to a smart contract a message that includes the IOT data; and a blockchain that stores the smart contract, wherein the smart contract includes instructions stored in a memory of a node of the blockchain, the instructions of the smart contract, when executed by a processor of the node of the blockchain, cause the node of the blockchain to: (a) validate the message by determining whether or not the edge computer is a designated owner of the smart contract, (b) execute a function of the smart contract to modify a variable of the smart contract when the edge computer is the designated owner of the smart contract, and (c) prevent execution of the function of the smart contract when the edge computer is not the designated owner of the smart contract.

5. The system of claim 4, further comprising:

a server computer comprising a processor and a memory, the memory of the server computer storing instructions that when executed by the processor of the server computer cause the server computer to: (a) receive from the edge computer a request to generate the smart contract, (b) generate the smart contract in response to the request, (c) indicate on the smart contract that the edge computer is the designated owner of the smart contract, and (d) deploy the smart contract on the blockchain.

6. The system of claim 4, wherein the instructions of the smart contract, when executed by the processor of the node of the blockchain, further cause the node of the blockchain to: (a) receive another message from another computer, (b) detect that the other computer is not the owner of the smart contract, and (c) prevent execution of the function in response to detecting that the other computer is not the designated owner of the smart contract.

7. A computer-implemented method to be performed by a smart contract deployed on a blockchain, the method comprising:

receiving a first message that is addressed to the smart contract;

comparing a sender of the first message to a designated owner of the smart contract that is indicated on the smart contract;

executing a function of the smart contract to modify a variable of the smart contract in response to detecting that the sender of the first message is the designated owner of the smart contract;

receiving a second message that is addressed to the smart contract;

comparing a sender of the second message to the designated owner of the smart contract that is indicated on the smart contract; and preventing execution of the function of the smart contract in response to detecting that the sender of the second message is not the designated owner of the smart contract.

8. The method of claim 7, wherein the first message is included in a transaction sent by an edge computer that is paired with an Internet of things (IOT) device.

9. The method of claim 8, wherein the message includes data generated by the IOT device.

* * * * *